(12) United States Patent
Minyailov

(10) Patent No.: US 7,571,180 B2
(45) Date of Patent: Aug. 4, 2009

(54) UTILIZING LDAP DIRECTORIES FOR APPLICATION ACCESS CONTROL AND PERSONALIZATION

(75) Inventor: Vyacheslav Minyailov, Redmond, WA (US)

(73) Assignee: Attachmate Corporation, Seattle, WA (US)

( * ) Notice: Subject to any disclaimer, the term of this patent is extended or adjusted under 35 U.S.C. 154(b) by 304 days.

(21) Appl. No.: 10/876,764

(22) Filed: Jun. 28, 2004

(65) Prior Publication Data

US 2004/0267670 A1 Dec. 30, 2004

Related U.S. Application Data

(60) Provisional application No. 60/483,008, filed on Jun. 27, 2003.

(51) Int. Cl.
*G06F 17/30* (2006.01)
(52) U.S. Cl. .......................................... 707/102; 707/3
(58) Field of Classification Search ................ 707/707, 707/1–10, 100–104.1, 200–2; 705/14, 37, 705/400; 709/223, 217, 225, 245; 700/237; 726/3, 5, 15, 17; 713/150, 156; 714/38; 717/177; 711/164; 340/5.22
See application file for complete search history.

(56) References Cited

U.S. PATENT DOCUMENTS

| | | | |
|---|---|---|---|
| 6,609,128 B1* | 8/2003 | Underwood ................. | 707/10 |
| 7,020,697 B1* | 3/2006 | Goodman et al. ........... | 709/223 |
| 2003/0061174 A1* | 3/2003 | Menninger ................... | 705/400 |
| 2003/0069786 A1* | 4/2003 | Hoffman et al. .............. | 705/14 |

(Continued)

OTHER PUBLICATIONS

VeriSign Business Guide, "Establish Trust to Protect and Grow Your Online Business" (2002).

(Continued)

*Primary Examiner*—Diane Mizrahi
(74) *Attorney, Agent, or Firm*—Nixon & Vanderhye PC

(57) ABSTRACT

Lightweight LDAP Access Control for authorization and personalization integrates with a directory service for defining sessions for users and groups without requiring read access or modification to directory schemas. In one exemplary illustrative non-limiting implementation, authorization/personalization data is stored in a private data store outside of the LDAP directory (e.g., on a management or other server). When a user attempts to log on to the computer system, the LDAP directory is queried for a list of associated groups and/or organizational units in the normal way. To compute a resulting set of authorization/personalization rules applicable to the user, an entity (.e.g., the management or other server) traverses the organizational hierarchy of the directory groups/OU's, overriding the inherited attributes with explicitly associated ones. Integration with existing user/group/organization unit infrastructures is provided while avoiding the need to deploy additional user/group databases. In one example arrangement, an LDAP directory is queried for the list of groups and OUs during user logon. There is no need to replicate user/group directory data in a private data store of the Management Server. This improves performance and eliminates the need to synchronize data between the directory and the private data store of the Management Server. To compute the resulting set of authorization/personalization rules applicable to a user, the Management Server traverses the organizational hierarchy of directory groups/OUs, overriding the inherited attributes with the explicitly mapped ones. This minimizes the amount of administrative work for restricting access to protected resources for individuals. In many cases, users will simply inherit authorization/personalization data from the group/OUs they are members of.

7 Claims, 5 Drawing Sheets

U.S. PATENT DOCUMENTS

| | | | |
|---|---|---|---|
| 2003/0069823 A1* | 4/2003 | Hoffman et al. | 705/37 |
| 2005/0005133 A1* | 1/2005 | Xia et al. | 713/185 |
| 2007/0112790 A1* | 5/2007 | Harvey et al. | 707/100 |
| 2007/0130616 A1* | 6/2007 | Ng et al. | 726/4 |
| 2007/0150947 A1* | 6/2007 | Vijayakumar et al. | 726/17 |
| 2007/0156659 A1* | 7/2007 | Lim | 707/3 |
| 2007/0192329 A1* | 8/2007 | Croft et al. | 707/10 |

OTHER PUBLICATIONS

Wahl, M., "A Summary of the X.500 (96) User Schema for use with LDAPv3," RFC 2256 (IETF Dec. 1997).

* cited by examiner

UTILIZING LDAP DIRECTORIES FOR APPLICATION ACCESS CONTROL AND PERSONALIZATION

CROSS-REFERENCE TO RELATED APPLICATIONS

This application claims priority from provisional application No. 60/483,008 filed Jun. 27, 2003 entitled "Utilizing LDAP Directories For Application Access Control And Personalization", the entire contents of which are incorporated herein by reference.

FIELD

The technology herein generally relates to authorization and permissions, and more specifically to efficiently and easily integrating access control and personalization applications with existing directory services such as Lightweight Directory Access Protocol (LDAP). An exemplary illustrative non-limiting implementation stores authorization/personalization data in a private data store outside of an LDAP directory; queries the LDAP directory for a list of groups and/or organizational units ("OU's") during logon by a user; and computes a resulting set of authorization/personalization rules applicable to the user by traversing the organizational hierarchy of directory groups/OU's and overriding inherited attributes with explicitly associated ones.

BACKGROUND AND SUMMARY

Generally, a computer directory is like a database, but it usually contains (more) descriptive information. Computer systems use directories for various different functions. In computer networking, "directory services" refers to a set of services that allow a computer or user to locate other computers, users and/or resources on the network. For example, if your computer is connected to a network, you may be able to use directory services to determine what printers you can print on, what other users you can communicate with, and/or what servers or host computers you can (and/or are allowed to) access.

The use of a particular type of computer directory called "Lightweight Directory Access Protocol" ("LDAP") directories for managing organizational data has been gaining popularity in recent years. In fact, LDAP has become a de facto standard way for providing access to directory services in the enterprise and to store information about users, groups, and organizational units (OU) in the enterprise.

LDAP provides a hierarchical/network database and associated specialized database management system optimized for prevailing use of read operations. Typically, it is used to maintain company information about people, organizational units ("OU's") and office equipment such as computers, printers, etc. See for example the "A Summary of the X.500 (96) User Schema for use with LDAPv3" RFC 2256 (IETF Dec. 1997), incorporated herein by reference.

LDAP directories are often designed for quick response to high-volume look-up and search operations. They can be used to store any kind of object, but most typically are used to store organizational data—for example, users and groups. Some enterprises continues to use relational databases, but for read-access, they're generally slower than LDAP. It is also possible to use enterprise access-management software—but even these products in most cases use an LDAP directory as the back end.

To lower the total cost of ownership (TCO), companies are seeking to maximize use of centrally managed personal data by various enterprise applications. LDAP directory services—which can be accessed and shared by a number of different software applications across an enterprise—is a good way to leverage this capability to provide increased consistency and efficiency. Imagine the efficiency gains that could be realized if a large corporation could use a single directory database for many different software applications instead of trying to replicate the same information in many different databases.

One challenge relating to LDAP and other such directory services arises in how to effectively integrate host access and other products with LDAP. Companies often have legacy systems whose security standards sometimes don't meet modern requirements. LDAP is a good way to fortify existing authentication systems. While one approach is using LDAP to store user/group infrastructure, there are advantages to working with existing users and groups without requiring modification of the LDAP content and/or storage schema.

There may be a difference in at least some applications between directory integration and directory utilization. For example, directory utilization may merely involve using LDAP to store a new applications' own user/group infrastructure. Directory integration, on the other hand, can go beyond utilization to actually integrate with LDAP to work with the customer's existing users and groups. Such integration can be advantageous in providing increased efficiency to leverage off of an enterprise's existing (and often extensive) LDAP information.

Exemplary illustrative non-limiting implementations of the technology described herein provides true integration with LDAP—providing enhanced authorization/personalization functionality without need to modify or change LDAP directory structure. In one exemplary illustrative non-limiting implementation, authorization/personalization data is stored in a private data store outside of the LDAP directory (e.g., on a management or other server). When a user attempts to log on to the computer system, the LDAP directory is queried for a list of associated groups and/or organizational units in the normal way. To compute a resulting set of authorization/personalization rules applicable to the user, an entity (e.g., the management or other server) traverses the organizational hierarchy of the directory groups/OU's, overriding the inherited attributes with explicitly associated ones.

A storage medium storing executable instructions providing an authorization service for authorizing users to access protected resources may store the following instructions: first instructions that query and receive user information from a directory database; second instructions that create authorization associations with respect to user information received from said directory database; and third instructions that store, retrieve said associations to/from a private data store separate from said directory database to override inherited attributes.

The following are additional non-limiting representative advantageous features:

LDAP Access Control: Integrates with a directory service for defining sessions for users and groups Lightweight LDAP integration: no requirement to modify directory schema, only read access is required.

Integration with existing user/group/OU infrastructures; no need to deploy additional user/group databases.

Use of LDAP directories for authorization and personalization

Elimination or minimization of data synchronization problems

High performance

Versatile: In one example implementation, supports any LDAP version 2- or 3-compliant directory service, e.g. Microsoft Active Directory, Novell Directory Services (NDS), SunONE (iPlanet/Netscape), IBM Secureway, OpenLDAP, Generic LDAP compliant (RFC 2256), other.

Authorization/personalization data is stored in a private data store of the management server, i.e., outside the LDAP directory (this eliminates the need for write access to the LDAP directory and also eliminates the need to modify the LDAP directory schema)

LDAP directory is queried for the list of groups and OUs during user logon. (There is no need to replicate user/group directory data in a private data store of the Management Server. This improves performance and eliminates the need to synchronize data between the directory and the private data store of the Management Server.)

To compute the resulting set of authorization/personalization rules applicable to a user, the Management Server traverses the organizational hierarchy of directory groups/OUs, overriding the inherited attributes with the explicitly mapped ones. (This minimizes the amount of administrative work for restricting access to protected resources for individuals. In many cases users will simply inherit authorization/personalization data from the group/OUs they are members of.)

Can be effectively used for providing personalized access to protected application resources relying on an existing user/group infrastructure.

Access to LDAP organizational and personal entries, which contain information about users, groups, organizations, organizational units, etc.

Effective way of utilizing existing user/group infrastructures for application access control and personalization.

One exemplary configuration consists of the following:

A management server that provides access control and personalization services to clients.

A collection of protected resources, e.g. Web content, mobile java code, etc.

Administrative tools, e.g. an administrative console, capable of setting up access permissions and personalization attributes for protected resources.

Client code, which can request personalized access to protected resources.

One example "Access Mapper" implementation provides a powerful and easy-to-use user interface for controlling access to host sessions. The user interface (UI) is search-based, not tree-based—which makes it scalable. Directory administrators seem to prefer a search-based approach because it allows them to get the information they need much faster. The exemplary illustrative login form is also very flexible. Most people are familiar with the typical case: user name and password. There are times, however, when that isn't enough. For example, when a person wishes to access their bank account online, he or she may need to input a lot of information including for example social security number, bank account, and password. The exemplary illustrative login provides forms like this, with more than one identity attribute.

The exemplary illustrative implementation also can work with many different directory implementations. If the end user has a directory that's not on the list, there's even a Generic LDAP Directory option.

The exemplary illustrative implementation can also communicate with directories very fast. For example, it is possible to maintain a pool of pre-established connections for re-use. This saves processing resources on the directory side and on the web server. For example, if a user belongs to a nested group, it's not optimal to open and close connections to the directory repeatedly. Such connection opening and closing can be eliminated. Another thing that makes for faster performance is storing most of the authorization and personalization data locally, on the server side. This avoids the need to query the directory for every piece of information, every time.

One exemplary illustrative non-limiting implementation provides a storage medium storing executable instructions providing an authorization service for authorizing users to access protected resources, said storage medium storing the following instructions: first instructions that query and receive user information from a directory database; second instructions that create authorization associations with respect to user information received from said directory database; third instructions that store, retrieve said associations to/from a private data store separate from said directory database to override inherited attributes.

BRIEF DESCRIPTION OF THE DRAWINGS

These and other features and advantages are better and more completely understood by referring to the following detailed description of presently preferred exemplary illustrative non-limiting implementations in conjunction with the drawings, of which.

DETAILED DESCRIPTION

Figure 1:
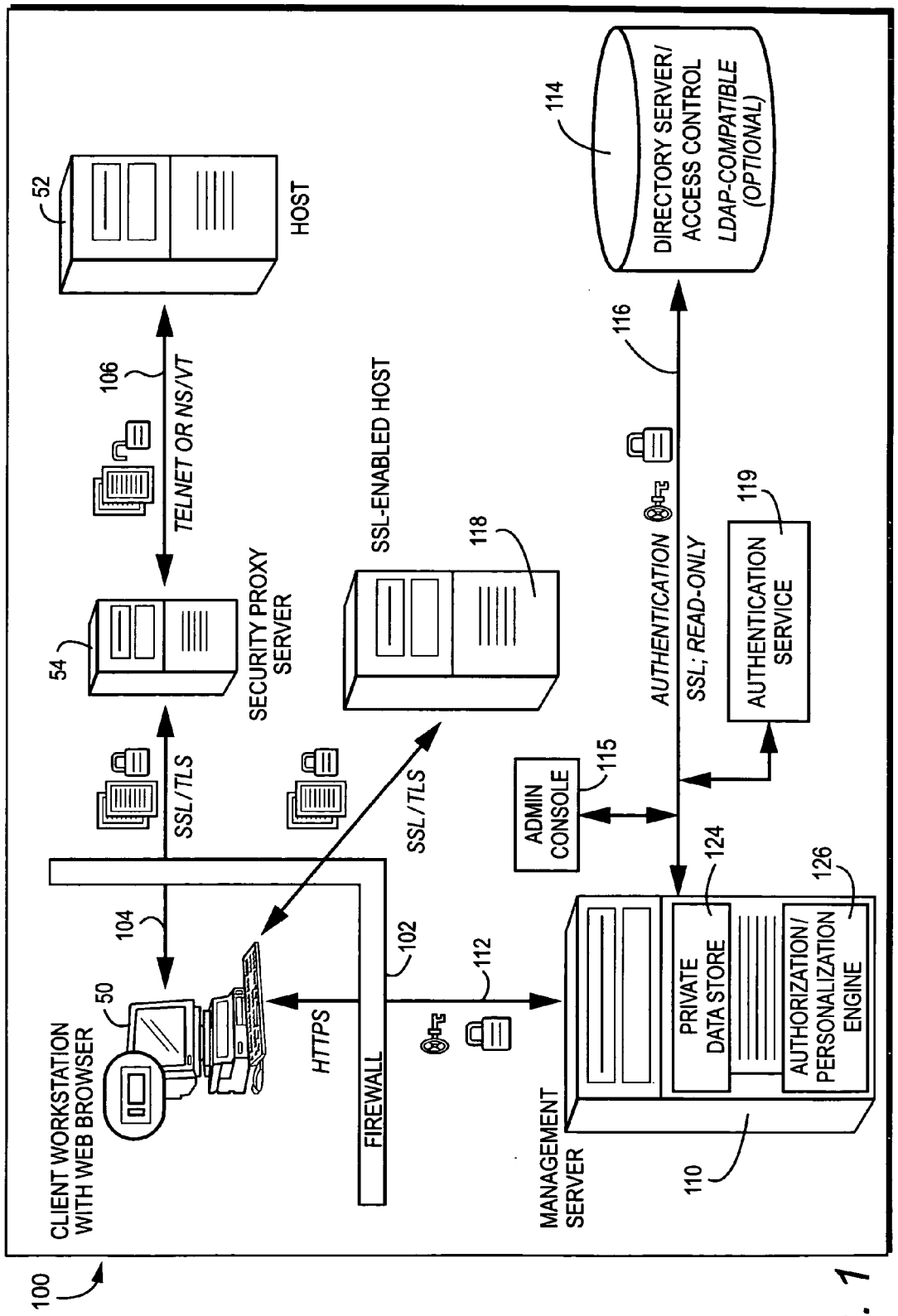
FIG. 1 shows an example illustrative non-limiting overall computer network including integration with LDAP directory services.

FIG. 1 shows an example overall non-limiting illustrative implementation of a secure computing arrangement 100. Computing arrangement 100 may include a user or client device 50 that wishes to communicate with a computer 52, a computer 118 or other computing resource. The user device 50 may be any sort of device having an input means and an indicating means. Examples include a personal computer workstation with World Wide Web browser running Microsoft Windows, Macintosh, Linux, Unix or any other suitable operating system, a web-enabled cellular telephone, personal data assistant, entertainment device, or any other networked computing device. Computer 52 may be any computing or networked resource. In one specific non-limiting example, computer 52, 118 comprises a so-called "legacy" host computer such as a mini computer or main frame computer (e.g., an IBM or other main frame, an AS/400 or other midsize computer, a Unix host, an OpenVMS host, Hpe3000, or any other environment).

User device 50 may communicates with computer 52, 118 directly or through a security proxy server 54. In the particular example shown, the user device 50 is located outside of a firewall 102, and may be connected to the security proxy server 54 via any convenient networking or other data communications arrangement including for example the Internet, a Virtual Private Network (VPN), a wireless network or connection, a local area or wide area network, or any other desirable data communications link. In the exemplary arrangement shown, a suitable conventional secure protocol is used to provide privacy and authentication for the communications between user device 50 and security proxy server 54 occurring over link 104. In one exemplary arrangement, the SSL/TLS protocol may be used but other implementations may use additional and/or different security protocol arrangements depending upon a particular need and other circumstances.

In the example shown, the security proxy server 54 communicates within the firewall 102 with computer 52 over an additional data link 106. Data link 106 can but need not be protected (e.g., with encryption) depending upon the particular circumstances (e.g., physical security may be adequate to protect the data being communicated over the link). In the general case, there will be multiple user devices 50 communicating with security proxy server 54 and/or security proxy server 54 may be communicating with many different computers 52 or other computing resources.

System 100 in the exemplary illustrative implementation also includes a management server 110. Management server 110 in the exemplary non-limiting arrangement shown manages communications between user device 50 and computer 52 by communicating with the user device 50. Management server 110 does this for example by issuing authorization tokens, certificates, or other credentials to user device 50 that can be authenticated by security proxy server 54 and/or computer 118 and used to guide or control the permissions granted to the user device. In this particular instance, the user device 50 is not trusted at least because it is outside of firewall 102. In the exemplary implementation, management server 110 generates or supplies secure credentials such as authorization tokens which it supplies to the user device 50. User device 50 may be unable to access computer 52, computer 118, secure proxy server 54 or other computing resources without an unexpired, appropriate security credential.

In the exemplary implementation, management server 110 includes a private data store 117 and an authorization/personalization engine 121. It authenticates user devices and clients 50, and supplies secure credentials to user device 50 over a link 112 that passes outside of firewall 102. In the example shown, a secure communications protocol (e.g., HTTPS) of conventional nature is used to protect link 112 and to authenticate user device 50 to the management server 110 so the management server can be assured it is not providing the authorization token to an attacker or other unauthorized user. As part of this secure protocol, user device 50 may be required to prove it is authentic (e.g., by providing a password, a certificate, etc.). Management server 110 in this example issues secure credentials only to authentic users.

In one example non-limiting implementation, management server 110 may comprise a "Reflection for the Web" (RWeb) management server installed on a conventional web server computer. An application server such as Tomcat or Websphere may be used. User device 50 may provide a conventional web browser that supports JAVA or other applet technology—these applets being used to provide host or other emulation functionality in this particular example. In the illustrative non-limiting example shown, the communications between the user device 50 and the management server 110 is HTTPS, although other secure communications protocols could be used instead. In the illustrative non-limiting example shown, the communication between the user device 50 and the security proxy server 54 and with host 118 is SSL/TLS over TCP/IP although other secure protocols and transport protocols may be used in other applications as desired.

Management server 110 also has access to a conventional directory server 114 providing access control and authorization information (e.g., via conventional LDAP or other directory services) to determine which authorizations to grant to particular user devices 50. Management server 110 in this illustrative example communicates with directory server 114 via a secure (e.g., SSL-protected) data link 116 within firewall 102. Generally, as is well know, the LDAP server 114 stores a directory database including LDAP entries comprising records composed of attributes and values. In this general context, a "distinguished name ("DN") is a special attribute in an LDAP entry referenced with the mnemonic DN. The DN is generally unique in the LDAP namespace. Its components are parts of the LDAP entry. A "unique identifier" ("UID") is a special attribute of LDAP entries available in some directory implementations that can be used instead of DN to uniquely identify LDAP records. In MS Active Directory it is known as Global Object Identified (GID). A "directory schema" is generally metadata that defines entry and attribute types used in LDAP database. A "protected resource" is generally a piece of data or code that is subject to access control and personalization, e.g. Web content, mobile java code, etc.

The system of FIG. 1 also includes an administrative console 115 and an authentication service 119. The administrative console 115 is used in the exemplary arrangement by administrators to administer permissions and the like. The authentication service 119 (which is optional) can be used to authenticate users, devices, resources, etc.

In summary, the described configuration uses the following exemplary components:

Client Application 50—any code running on behalf of an authenticated user, e.g. Web browser, java applet, standalone application, etc. Client Application can request personalized access to protected resources controlled by the Management Server.

Management Server 110—provides authentication, authorization, and personalization services to the application clients. It controls access to protected resources.

LDAP Directory 114—An external component used as a source of organizational and personal data by authorization/personalization engine of the Management Server to determine authorization and personalization rules associated with a protected resource.

Authentication Service 119—An external component used for verification of user credentials, e.g. LDAP server, NT domain server, SiteMinder Policy Server, RSA Authentication Server, etc.

Private Data Store 117—A database used by the Management server 110 for fast and easy access to authorization/personalization data associated with users, groups, and OUs.

A collection of Protected Resources (e.g., 54, 118, 52, etc).—Any application resource that is subject to access control and personalization, e.g. Web content, mobile java code, etc.

Administrative Console 115—An administrative tool that enables administrator to set access permissions and personalization attributes for different users, groups, and OUs on protected resource-basis.

Example LDAP Integration

Figure 2:
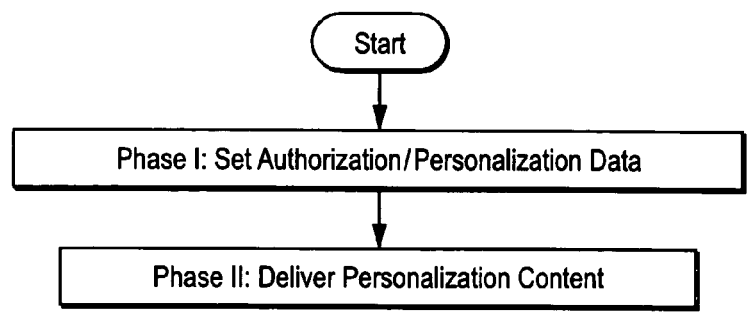
FIG. 2 shows an example illustrative non-limiting process including two phases.

The procedure of providing a user with personalized access to protected application resources consists of two steps in the exemplary arrangement (see FIG. 2). First, administrator has to assign rights to access specific application resources to different user communities (FIG. 2 block 202). The administrator can also associate different personalization parameters with resources accessible by different user communities. Second, during user logon the authorization/personalization engine 121 of the Management Server 110 finds the user's place in the organizational hierarchy and computes the applicable set of authorization/personalization data (FIG. 2 block 204).

In more detail, phase 1 (setting authorization/personalization data) may involve an administrator using an administrative tool to look up organizational and personal data in a directory. The administrator can locate user/group/OU entries in the directory and authorize them to access different areas of the managed application (protected resources). Administrator can also associate personalization data with the entries. The associated authorization/personalization data gets stored in a private data space of the management server 110 for easy and fast access. It can be a proprietary data store on a local disk, RDBMS, etc. The management server 110 can use either distinguished names (DN) or unique identifiers (UID) of the entries as database keys for locating authorization/personalization engine that supports hierarchical access rules. User can be a member of an OU, which is a member of another OU and so forth. This is also true for nested groups. Administrator can associate authorization/personalization data with any node in the hierarchy. To compute the resulting set of authorization/personalization data applicable to an entry, the management server traverses the organizational hierarchy starting with the least specific top-level node overriding/merging the inherited and directly associated data.

In more detail, one exemplary non-limiting implementation of phase 2 (delivering personalized content) involves a user device 50 requesting a protected resource from the management server 110. The management server 110 initiates a logon procedure. During logon, it can authenticate the user through different authentication services, e.g. LDAP, NT domain server, etc. On successful authentication, the management server 110 tries to resolve the user's identity through LDAP directory 114. If resolution is successful, the application gets the user's DN/UID, as well as DNs/UIDs of all the groups and OUs the user is a member of. It builds an attribute inheritance tree for the user. The obtained identifiers are used as keys into the authorization/personalization data stored in phase 1 in the private data space. The application traverses the hierarchy, overriding/merging the authorization/personalization data in each node of the built tree. If the resulting access control list includes the requested resource, the application delivers it to the client along with any associated personalization data.

Figure 3:
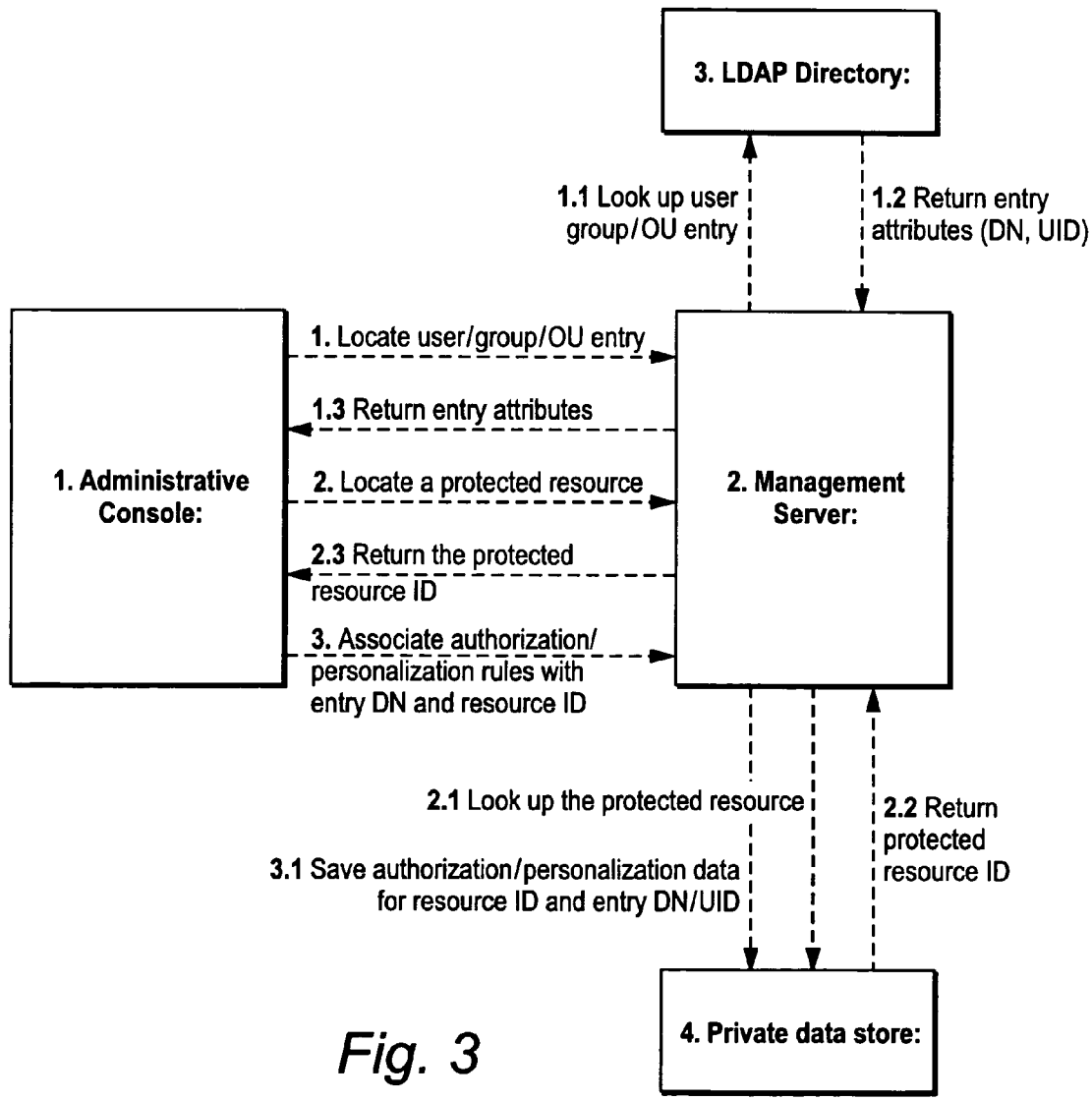
FIG. 3 shows a more detailed arrangement of the first phase showing exemplary non-limiting illustrative interaction between an administrative console, a management server, an LDAP directory and a private data store.
Figure 4:
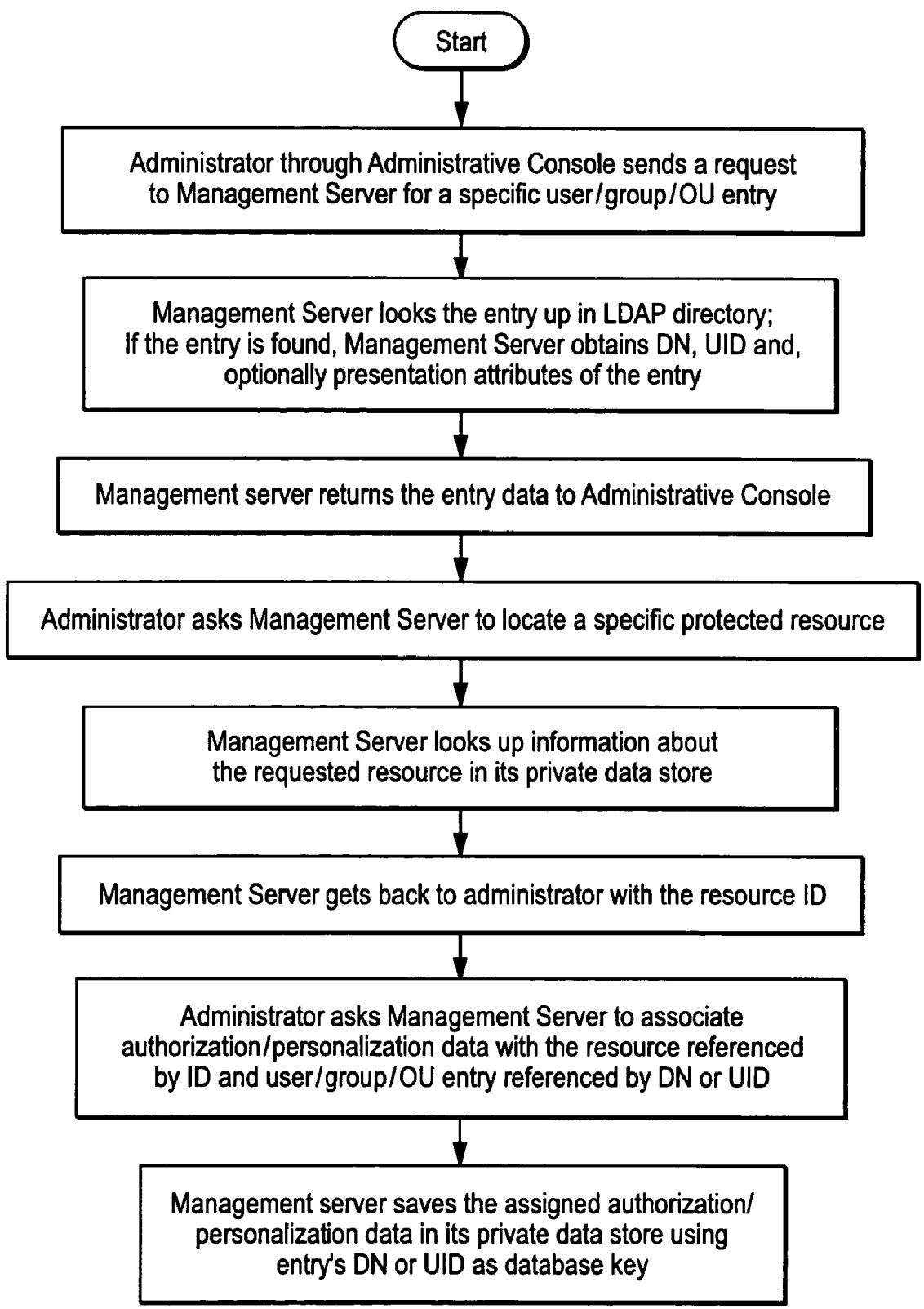
FIG. 4 shows an example non-limiting illustrative process for the first phase.

FIG. 3 details an exemplary non-limiting technique for illustrating the process of setting the authorization/personalization data for directory entries, and FIG. 4 is a flowchart of exemplary non-limiting steps including:

Administrator through Administrative Console sends a request to Management Server for a specific user/group/OU entry (block 302).

Management Server looks the entry up in LDAP directory. If the entry is found, Management Server obtains DN, UID and, optionally, presentation attributes of the entry (block 304).

Management server returns the entry data to Administrative Console (block 306).

Administrator asks Management Server to locate a specific protected resource (block 308).

Management Server looks up information about the requested resource in its private data store (block 310).

Management Server gets back to administrator with the resource ID (block 312).

Administrator asks Management Server to associate authorization/personalization data with the resource referenced by ID and user/group/OU entry referenced by DN or UID (block 314).

Management server saves the assigned authorization/personalization data in its private data store using entry's DN or UID as database key (block 316).

Figure 5:
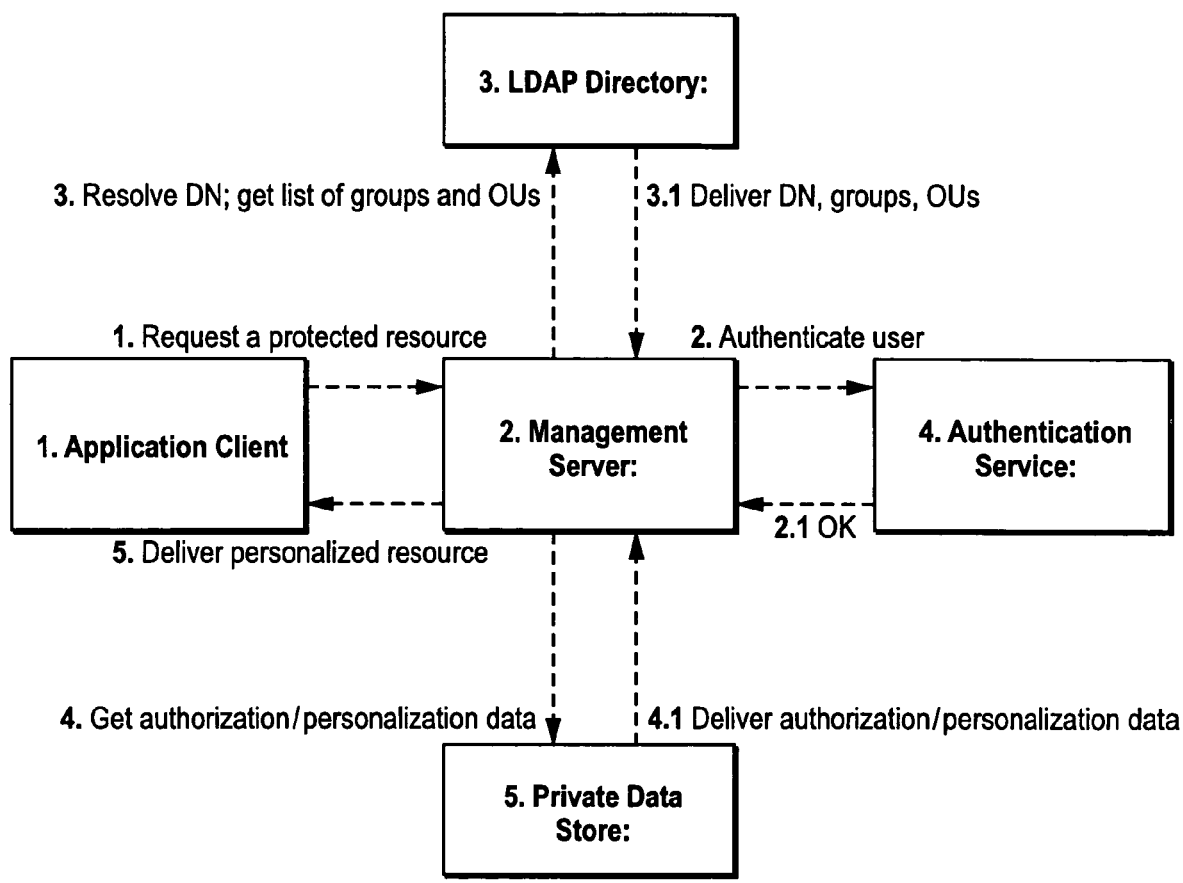
FIG. 5 shows a further exemplary illustrative non-limiting arrangement for the second phase including an authentication service.
Figure 6:
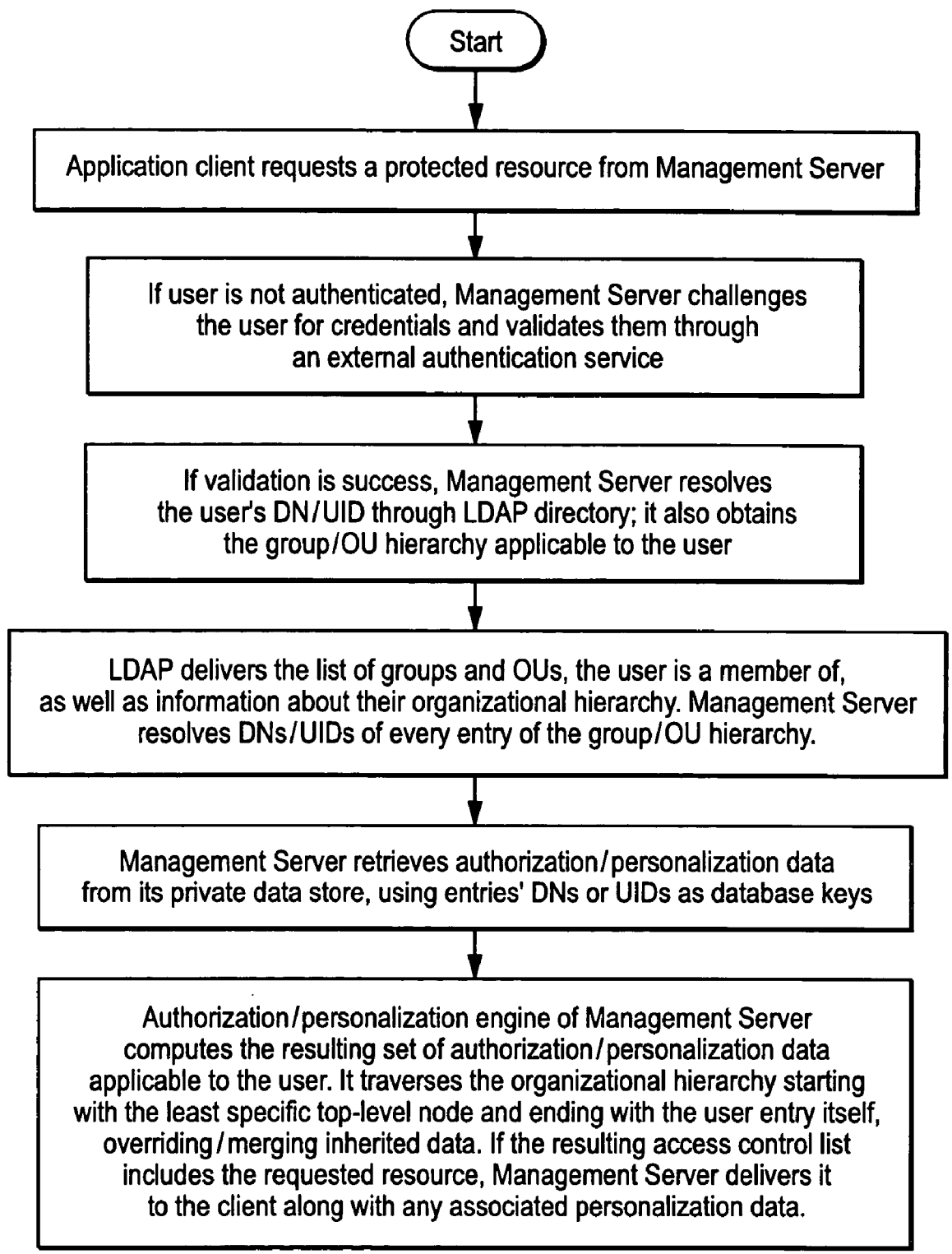
FIG. 6 shows an example non-limiting illustrative process for the second phase.

FIG. 5 illustrates the process of delivery of personalized protected application content to the user, and FIG. 6 is a flowchart of example non-limiting steps involved in this process:

Application client requests a protected resource from Management Server (block 402)

If user is not authenticated, Management Server challenges the user for credentials and validates them through an external authentication service (block 404).

If validation is success, Management Server resolves the user's DN/UID through LDAP directory. It also obtains the group/ou hierarchy applicable to the user (block 406).

LDAP delivers the list of groups and OUs, the user is a member of, as well as information about their organizational hierarchy. Management Server resolves DNs/UIDs of every entry of the group/OU hierarchy (block 408).

Management Server retrieves authorization/personalization data from its private data store, using entries' DNs or UIDs as database keys (block 410).

Authorization/personalization engine of Management Server computes the resulting set of authorization/personalization data applicable to the user. It traverses the organizational hierarchy starting with the least specific top-level node and ending with the user entry itself, overriding/merging inherited data. If the resulting access control list includes the requested resource, Management Server delivers it to the client along with any associated personalization data (block 414).

Exemplary Alternative Arrangements

Applications can alternately store their authorization/personalization data in the same LDAP directory, which is used for user/group/OU lookups. There are certain aspect of this approach that may be undesirable for certain applications and contexts however:

1. Requires write directory access
2. May require modification of directory schema
3. May be inconvenient to deploy and configure. Deployment procedure depends on directory type; enterprise administrators are reluctant to allow applications to modify the key enterprise data.

Another alternative approach is to import user/group/OU infrastructure into an application private data store. Applications can alternately import all user/group/OU data from a directory into their private data store. Such administrative procedure can be performed either interactively on occasional basis, or periodically as a scheduled background job. Possible ramifications of this alternative arrangement are:

1. In highly populated user/group environments, the synchronization of huge volumes of directory data can take a considerable amount of time and computation resources.
2. Synchronization problems. As new users are created or existing users are moved between groups or OUs, the imported directory data gets out-of-sync with the directory and needs to be updated.

3. An attempt to minimize the synchronization problem by increasing the frequency of periodic data updates can have a significant impact on the application performance.

It is to be understood that the invention is not to be limited to the disclosure, but on the contrary, is intended to cover various modifications and equivalent arrangements included within the scope of the claims.

The invention claimed is:

1. A computer system comprising:
   a lightweight directory access protocol directory storing organizational units and associated user names and providing directory services, said directory services providing for user log-on into and authentication by the computer system; and
   a management server separate from said directory services but providing additional access services that assign or deny user access rights based on organizational units defined by said lightweight directory access protocol directory services, said management server comprising a private data store outside of the lightweight directory access protocol directory that stores authorization/personalization data, said management server querying said directory and applying additional authorization/personalization rules to enhance said directory services and override inherited attributes provided by said directory services without requiring modification of said directory and without requiring an additional user log-on.

2. A method of authorizing a computer system user comprising:
   providing user log-on and authentication using an LDAP directory storing organizational units and associated user names and providing directory services;
   receiving an access request related to said user;
   using a computer system to automatically reference said user in said LDAP directory and, if a corresponding user entry is found, to obtain and provide information pertaining to said user;
   associating at least one of authorization data and personalization data pertaining to said user with a protected resource that assigns or denies user access rights based on organizational units defined by said lightweight directory access protocol directory services;
   saving, by said computer, said authorization and/or personalization in a private data store separate from said LDAP directory; and
   responding to said request related to said user at least in part based on said referencing and associating to provide at least one resource access result conditionally allows said user to access at least one computer resource without requiring an additional user log-on.

3. A computer readable storage medium and instructions stored thereto, the instructions, when executed by a computer processor:
   use a private data store to provide an authorization service for authorizing users to access protected resources:
   query and receive user information from a directory database storing organizational units and associated user names and providing directory services, said directory services providing for user log-on into and authentication by the computer system;
   create authorization associations with respect to user information received from said directory database, said authorization associations assigning or denying user access rights based on organizational units defined by said lightweight directory access protocol directory services; and
   store said associations to said private data store separate from and not within said directory database and retrieve said associations from said private data store, to override, replace, or extend inherited attributes without requiring an additional user log-on.

4. A computer operating method comprising:
   querying an LDAP directory during computer user logon, said LDAP directory storing organizational units and associated user names and providing directory services, said directory services providing for user log-on into and authentication;
   traversing an organizational hierarchy of directory information in said LDAP directory;
   accessing a private data store separate from said directory, said private data store not replicating user/group directory data to eliminate need for detailed synchronization between the directory and the private data store;
   overriding inherited attributes from said traversed LDAP directory with explicitly mapped attributes obtained from said private data store; and
   restricting access to protected resources based on private data store authorization/personalization data contents without requiring an additional user log-on.

5. A method of logging a user onto a computer system comprising:
   receiving a user identification during a log on process;
   in response to said received user identification, querying a directory for a list of at least one of associated groups and organizational units associated with the user, said directory storing organizational units and associated user names and providing directory services, said directory services providing for user log-on into and authentication by the computer system;
   traversing an organizational hierarchy of directory and organizational groups provided by said directory services; and
   overriding inherited attributes provided by said directory services with explicitly associated attributes obtained from a private data store outside of the directory; and
   using said overrided inherited attributes to control access to at least one resource without requiring an additional user log-on.

6. The method of claim 5 wherein said directory is an LDAP directory.

7. The method of claim 5 wherein said querying is performed by a management server.

* * * * *